United States Patent Office 3,776,892
Patented Dec. 4, 1973

3,776,892
ACRYLAMIDE POLYMER AND METHOD OF FLOCCULATING AN AQUEOUS SUSPENSION OF SOLID PARTICLES THEREWITH
Merrill Bleyle, Waltham, Mass., assignor to W. R. Grace & Co., Cambridge, Mass.
Filed July 2, 1971, Ser. No. 159,293
Int. Cl. C08f 15/40
U.S. Cl. 260—80.73    4 Claims

ABSTRACT OF THE DISCLOSURE

Polymers containing a major amount of acrylamide copolymerized with an aliphatic carboxylic acid and an aminoester are useful for flocculating aqueous suspension of finely divided solid particles.

---

Figure 1:
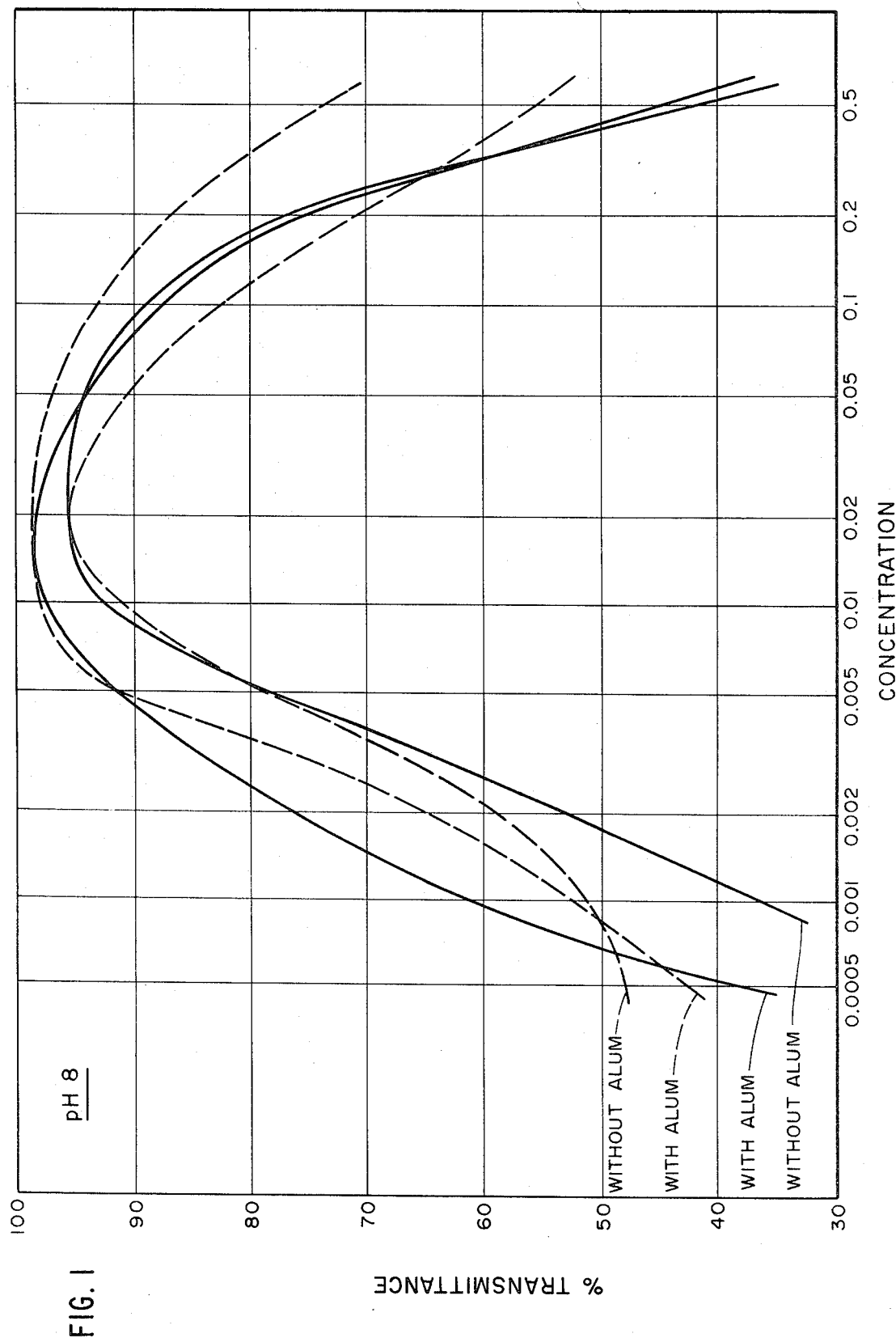

This invention relates to novel acrylamide polymers. More particularly, this invention concerns novel high molecular weight water-soluble polymers of acrylamide, which polymers are ideally suited for flocculating aqueous suspension of finely divided solid particles.

Polyelectrolyte organic polymers such as polyacrylamide have found wide use in industrial water treatment programs as flocculant or coagulant aids. Chief among industrial users of the polyelectrolyte flocculant is the pulp and paper industry, in which the polyelectrolyte organic polymer coagulant are useful to clarify and decolor influent water; to retain cellulosic fines, rosin size, pigments, etc., with fibers; to improve drainage and sheet strength and also to clarify so called "white water" effluent. Other industrial areas in which the polyelectrolyte flocculant find significant application include the petroleum, mining, metal working and plating industries as well as municipal sewage treatment facilities.

While generally effective in pulp and paper processing, the use of polyelectrolyte organic polymers as flocculant or coagulant has not been free from drawbacks. For example, certain polyelectrolytes are effective only in the presence of alum, widely used in "sized" paper, while certain other polyelectrolyte organic polymers are effective only in its absence. Also, certain of the polyelectrolyte coagulants suffer substantial loss of flocculating ability at high or low pH conditions.

In the present invention, a small amount of a high molecular weight, water-soluble polymer of acrylamide, a copolymerizable carboxylic acid and a copolymerizable aminoalkylester has been found to be highly effective in flocculating or coagulating aqueous suspensions of solid particles. Specifically, the polymer employed as a flocculant in the invention contains a major amount, preferably from about 80 to 98 percent by weight, of acrylamide, from 1 to 10, preferably from about 3 to 8 percent by weight of a monoethylenically unsaturated aliphatic carboxylic acid containing from 3 to about 15 carbon atoms and from 1 to 10, preferably from about 3 to 8, percent by weight of an aminoalkylester of acrylic or methacrylic acid having the structural formula:

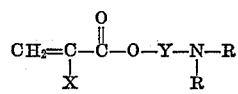

wherein X is hydrogen or a monovalent alkyl group of about 1 to 4 carbon atoms; Y is a divalent alkyl group of about 1 to 5 carbon atoms; and R is hydrogen or a monovalent alkyl group of 1 to about 5 carbon atoms. R in the above formula need not be the same. The polymers employed possess a molecular weight in the range of about 500,000 to 5,000,000 or higher, preferably about 1,000,000 to 3,000,000.

Illustrative monoethylenically unsaturated aliphatic car-boxylic acid comonomers for use in preparing the polymeric flocculant of the invention include monoethylenically unsaturated aliphatic monocarboxylic acids such as acrylic acid, methacrylic acid, crotonic acid, isocrotonic acid, chloroacrylic acid, etc.; and polycarboxylic acids such as maleic acid, fumaric acid, citraconic acid, aconitic acid, chloromaleic acid, etc. as well as mixtures thereof.

Illustrative examples of compounds suitable for use as the aminoalkylester comonomer include dimethylaminoethyl acrylate, diethylaminoethyl methacrylate, dimethylaminoisopropyl acrylate, t-butylaminoethyl acrylate, t-butylaminoethyl methacrylate, etc., as well as mixtures thereof.

The polymeric flocculant of the invention can be prepared using conventional polymerization techniques employed to prepare acrylamide polymers. For example, the polymer may be prepared in an aqueous system wherein the monomer is polymerized while in aqueous solution. Particularly advantageous are dispersion-polymerization methods wherein the monomeric mix is polymerized in the presence of a dispersing agent, water and an organic liquid to dissipate heat of polymerization. Suitable emulsifiers include non-ionic emulsifiers such as hydroxyethylated nonyl phenols hydroxyethylated long-chain monocarboxylic acid and fatty acid, fatty acid esters of cyclic monoanhydrosorbitol, hydroxyethylated fatty acid esters of cyclic monoanhydrosorbitol, etc. The quantity of emulsifier employed generally ranges between 0.01 and 5 percent by weight based on the monomeric mix. Suitable organic liquids for use in the polymerization procedure include carbon tetrachloride; dichloroethane; hydrocarbon, e.g., hexane, cyclohexane, benzene, toluene, xylene, etc., and mixtures thereof. The polymerization reaction is initiated using conventional water-soluble, free radical-producing polymerization catalysts such as alkali persulfates, alkyl hydroperoxide, hydrogen peroxide, either alone or in "redox" systems in combination with such reducing agents as alkali metabisulfites and sodium formaldehyde sulfoxylate. The catalyst is usually employed in an amount ranging between 0.001 and 2 weight percent of the monomeric mixture. The polymerization reaction is preferably carried out in the presence of a chain-transfer agent such as an alkanol, e.g., methanol. The polymerization is ordinarily carried out at a temperature between 30 and 100° C.

The amount of the flocculant of the invention employed to coagulate aqueous suspension of finely divided solid particles may vary according to the amount in character of the solid particles to be flocculated but in all cases will be an amount which is at least sufficient to flocculate the suspended particles. Generally, the amount employed will fall within the range of at least about 0.0005 to 0.5, preferably about 0.002 to 0.2 part by weight, based on the weight of the solid particles. The solid particles may be organic or inorganic in nature and are generally less than about 25 microns in size. The flocculant of the invention is particularly suited for coagulating aqueous suspensions of such finely divided inorganic particles as titanium dioxide, clays, talc, calcium carbonate, iron oxide, zinc oxide, and the like.

The following examples further illustrate the invention and should not be considered limiting.

EXAMPLE I

To a reactor are charged 54.6 parts by weight of N-hexane; 14.2 parts of a monomeric mixture containing 90 parts acrylamide, 5 parts crotonic acid and 5 parts t-butylaminoethyl methacrylate; 6 parts by weight methanol; and one part by weight polyoxylethylene sorbitan monostearate ("Tween 60"); the reactor contents are mixed to form a homogeneous dispersion and the batch heated to 55 to 58° C. Following a nitrogen flush, 9.5 parts by weight of an aqueous solution of potassium persulfate (0.3% total solids) is added quickly in the batch heated to 60° C. The reaction proceeds for about 2 hours and the acrylamide terpolymer is recovered in the form of fine beads. The polymer has a molecular weight of 1.1 million.

EXAMPLE II

A copolymer containing 90 percent by weight acrylamide and 10 percent by weight t-butylaminoethyl methacrylate is prepared following the procedure of Example I. The copolymer has a molecular weight of weight of 2.6 million.

The ability of the polymers in Examples I and II to retain titanium dioxide on paper pulp was tested at various pH conditions, both in the presence and the absence of alum, employing the following simulated retention test procedure.

An aqueous furnish is initially prepared containing 3.9 percent of bleached sulfite pulp and 30 grams titanium dioxide. A separate aqueous furnish is also prepared containing the aforementioned amounts of pulp and pigment, and in addition, 18.5 milliliters of 4.0 percent alum. An aqueous solution of the appropriate amount of polymers to be tested is prepared and added to a 1,000 ml. sample of pulp-pigment furnish and the furnish stirred. A 30 ml. sample is pipetted from the stirred furnish and placed on a Spectronic 20. The clarity of the sample is measured as percent transmittance at 650 mu. The percent transmission is compared against a pure water blank sample.

The results of the tests are reported in Table I below.

TABLE I.—PERCENT TRANSMITTANCE [1]

| Concentration [2] | Polymer of Example I | | | | | | Polymer of Example II | | | | | |
|---|---|---|---|---|---|---|---|---|---|---|---|---|
| | pH 3.0 | | pH 8.0 | | pH 11 | | pH 3 | | pH 8 | | pH 11 | |
| | A [3] | B [4] | A | B | A | B | A | B | A | B | A | B |
| 0.0005 | 47 | 50 | 39 | 30 | 52 | 45 | 62 | 15 | 42 | 47 | 52 | 31 |
| 0.001 | 58 | 66 | 65 | 37 | 67 | 57 | 76 | 22 | 54 | 50 | 69 | 33 |
| 0.002 | 67 | 74 | 74 | 54 | 74 | 60 | 83 | 28 | 62 | 57 | 81 | 38 |
| 0.005 | 85 | 86 | 88 | 79 | 83 | 65 | 90 | 45 | 92 | 79 | 89 | 27 |
| 0.01 | 95 | 98 | 98 | 94 | 95 | 64 | 96 | 67 | 98 | 92 | 95 | 26.5 |
| 0.02 | 96 | 99 | 94 | 95 | 96 | 35 | 94 | 79 | 96 | 96 | 94 | 22 |
| 0.05 | 94 | 99.5 | 94 | 95 | 96 | 10 | 93 | 69 | 98 | 88 | 91 | 15 |
| 0.1 | 87 | 98 | 87 | 88 | 92 | 8 | 91 | 65 | 94 | 85 | 73 | 12 |
| 0.2 | 75 | 90 | 76 | 78 | 83 | 6 | 87 | 50 | 88 | 70 | 55 | 11 |
| 0.5 | 35 | 64 | 43 | 42 | 25 | 4 | 82 | 33 | 73 | 55 | 23 | 11 |

[1] Measured as described above on a Spectronic 20.
[2] Weight percent based on solids weight.
[3] Flocculant tested in presence of alum.
[4] Flocculant tested without the presence of alum.

Figure 2:
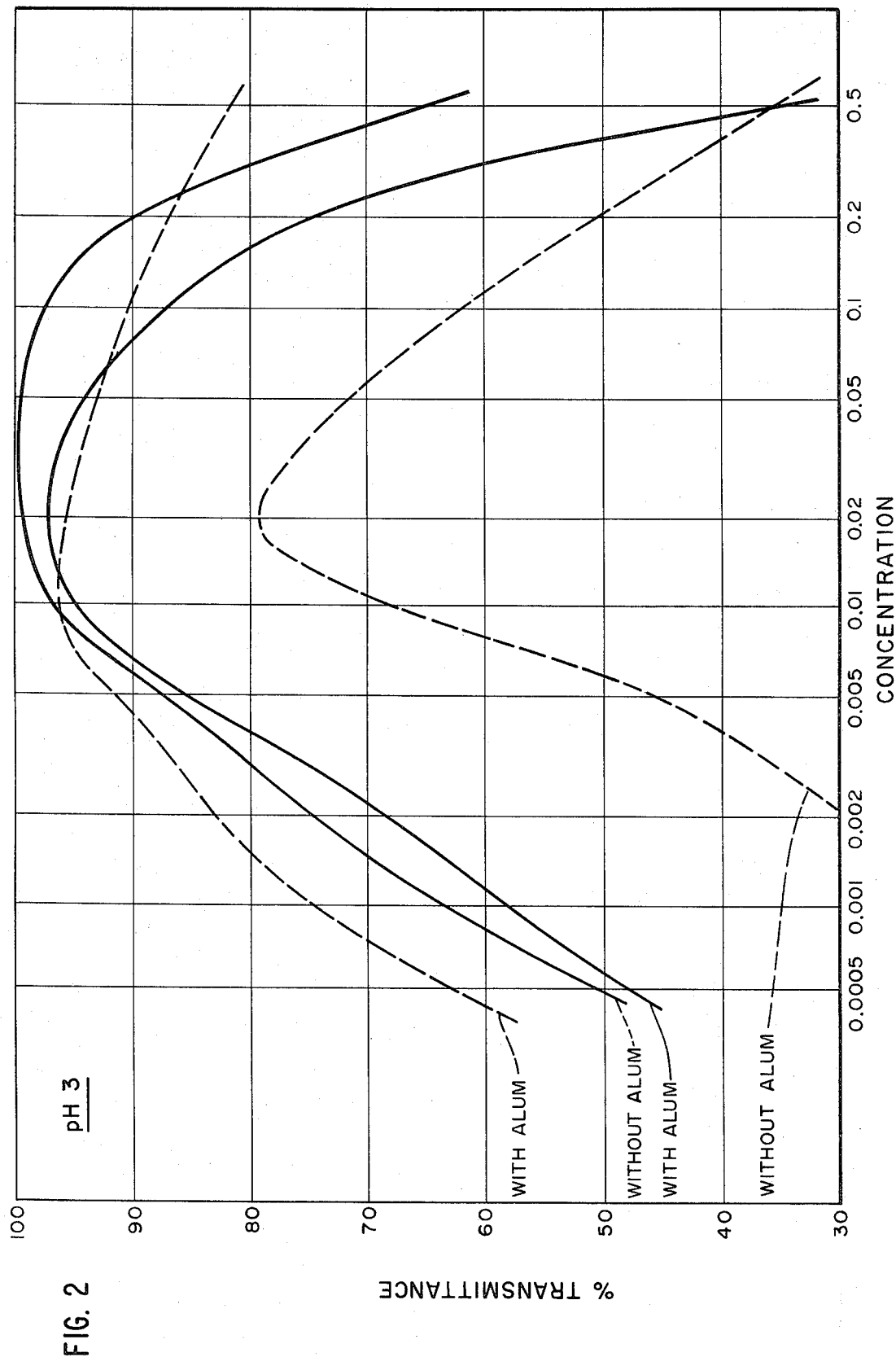
Figure 3:
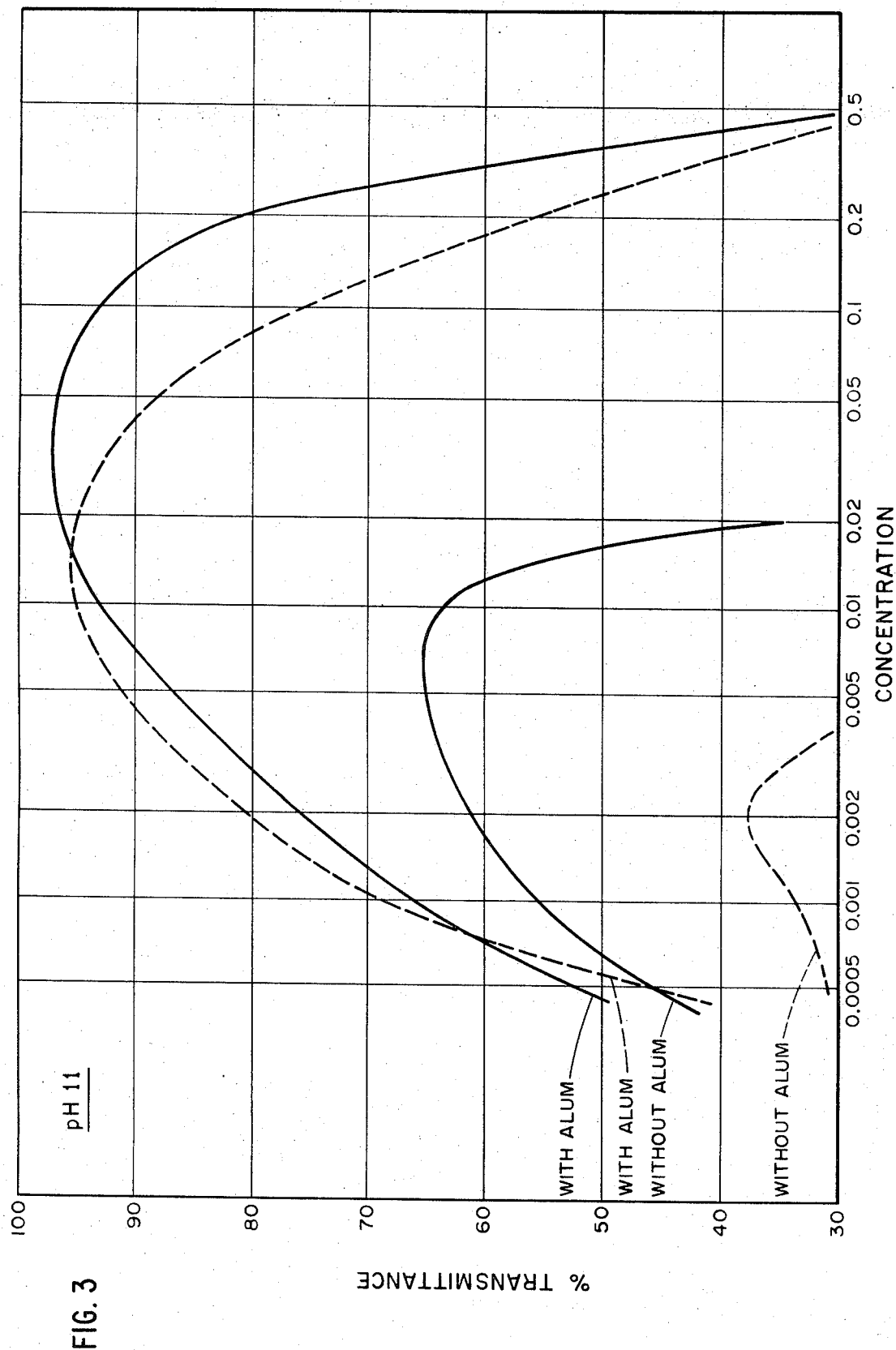

The data obtained and given in Table I was plotted on graph paper to afford a better comparison the results of the two polymers. In FIGS. 1, 2 and 3, percent transmittance is plotted against the concentration of polymer tested. FIG. 1 demonstrates graphically the results of the tests of the two polymers at a pH of about 8. In all of the figures, the polymer of Example I is represented by the solid line whereas the results obtained using the polymer of Example II are displayed in the form of a broken line. From the graph portrayed in FIG. 1 it is seen as equally effective at this pH range in the presence and in the absence of alum.

In FIG. 2, the results of the tests at a pH of about 3 are shown. The terpolymer of Example I again is shown to be substantially equally effective at this pH range both in the presence and the absence of alum. The copolymer of Example II, however, containing 10 percent by weight of the aminoalkylester and 90 percent acrylamide, was again highly effective in the presence of alum, but its effectiveness in the absence of alum is significantly decreased as compared to the performance of the terpolymer of Example I.

In FIG. 3 it is again seen that both polymers are highly effective at a pH of 11 in the presence of alum, but the effectiveness of the polymer of Example II in the absence of alum was much more diminished as compared to the performance of the terpolymer of Example I.

EXAMPLE III

A terpolymer containing 90 percent by weight acrylamide, 5 percent by weight methacrylic acid and 5 percent by weight crotonic acid is prepared following the procedure of Example I. The copolymer has a molecular weight of 1.5 million.

When tested for flocculating ability, the terpolymer of Example III is substantially as effective as the polymeric flocculant of Examples I and II in the presence of alum at a pH of about 8, yet its effectiveness in the absence of alum at the higher and lower pH range is materially reduced as in the case of polymeric flocculant of Example II.

EXAMPLE IV

A terpolymer containing 90 percent by weight acrylamide, 5 percent by weight methacrylic acid and 5 percent by weight dimethylaminoethyl methacrylate is prepared following the procedure of Example I. The terpolymer possessed a molecular weight of 1.7 million.

EXAMPLE V

A terpolymer containing 90 percent by weight acrylamide, 5 percent by weight acrylic acid and 5 percent by weight dimethylaminoethyl methacrylate is prepared following the procedure of Example I. The terpolymer has a molecular weight of 1.7 million.

It is claimed:

1. A terpolymer having a molecular weight within the range of $5 \times 10^5$ to $5 \times 10^6$ and containing a major proportion of acrylamide, from about 1 to 10 percent by weight of at least one copolymerizable monoethylenically unsaturated aliphatic carboxylic acid containing from 3 to about 15 carbon atoms, and from about 1 to 10 percent by weight of at least one copolymerizable aminoester having the structural formula:

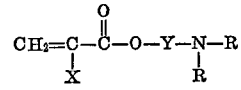

wherein X is hydrogen or a monovalent alkyl group containing about 1 to 4 carbon atoms; Y is a divalent alkyl group containing 1 to about 5 carbon atoms; and R is hydrogen or a monovalent alkyl group of 1 to about 5 carbon atoms.

2. The terpolymer of claim 1 wherein said copolymerizable carboxylic acid is crotonic acid.

3. The terpolymer of claim 1 wherein said aminoester is t-butylaminoethyl methacrylate.

4. A terpolymer containing from about 80 to 98 percent by weight of acrylamide, from about 3 to about 8 percent by weight of a monoethylenically unsaturated aliphatic carboxylic acid containing from about 3 to 15 carbon atoms and from about 3 to 8 percent by weight of at least one copolymerizable aminoester having the structural formula:

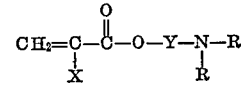

wherein X is hydrogen or methyl; Y is a divalent alkyl group containing 1 to about 5 carbon atoms, and R is a monovalent alkyl group containing from about 1 to 5 carbon atoms.

References Cited

UNITED STATES PATENTS 2,811,494   10/1957   Smith et al. ---------- 260—8
3,493,500    2/1970   Volk et al. ---------- 210—54

JOSEPH L. SCHOFER, Primary Examiner
S. M. LEVIN, Assistant Examiner

U.S. Cl. X.R.

162—168; 210—54; 260—78.5 R